(12) United States Patent
Demaj et al.

(10) Patent No.: US 7,653,865 B2
(45) Date of Patent: Jan. 26, 2010

(54) DECODING METHOD AND DEVICE

(75) Inventors: Pierre Demaj, Nice (FR); Giuseppe Montalbano, Villeneuve Loubet (FR)

(73) Assignee: ST-Ericsson SA, Geneva (CH)

( * ) Notice: Subject to any disclaimer, the term of this patent is extended or adjusted under 35 U.S.C. 154(b) by 540 days.

(21) Appl. No.: 10/584,502

(22) PCT Filed: Dec. 14, 2004

(86) PCT No.: PCT/IB2004/004190

§ 371 (c)(1),
(2), (4) Date: Jun. 22, 2006

(87) PCT Pub. No.: WO2005/064801

PCT Pub. Date: Jul. 14, 2005

(65) Prior Publication Data

US 2007/0171847 A1 Jul. 26, 2007

(30) Foreign Application Priority Data

Dec. 23, 2003 (EP) .................................. 03300286

(51) Int. Cl.
*H03M 13/03* (2006.01)
(52) U.S. Cl. ...................................................... 714/778
(58) Field of Classification Search .................. 714/778, 714/786, 794–795
See application file for complete search history.

(56) References Cited

U.S. PATENT DOCUMENTS 6,574,775 B1 * 6/2003 Chouly ........................ 714/800
6,956,891 B2 * 10/2005 Tan ............................. 375/140
7,237,180 B1 * 6/2007 Shao et al. ................... 714/778
7,353,170 B2 * 4/2008 Feldman et al. ............. 704/226

FOREIGN PATENT DOCUMENTS

EP 1353488 A1 10/2003

OTHER PUBLICATIONS

K. Ouahada et al., Soft decision decoding of some ternary line codes, Jul. 10, 2003, IEEE, electroinc letters, vol. 39. No. 14., p. 1068-1069.*
D. J. Van Wuk et al. A turbo coded Ds/CDMA system with embedded walsh Hadamand codeword: coder design and perofrmance evaluation, 1998, IEEE, p. 359-363.*
Ha-Yound Yang et al., A combination of multiple Turbo codes and multiple antennas with a reduced iterative decider for DS-CDMA systems, 1999, IEEE, p. 1595-1599.*

(Continued)

*Primary Examiner*—Shelly A Chase
(74) *Attorney, Agent, or Firm*—Peter J. Meza; William J. Kubida; Hogan & Hartson LLP

(57) ABSTRACT

A symbol sequence in a received DS-CDMA signal is decoded in an efficient manner in order to reduce the processing needs in a receiver when, e.g., processing acquisition indicators (AI) in a UMTS system. The decoding comprises iterative calculation of a hard-decision vector, using a decision threshold having a value based on the probability of each ternary alphabet element of each symbol in the hard-decision vector.

9 Claims, 3 Drawing Sheets

OTHER PUBLICATIONS

ETSI TS 125 211 V5.6.0 Technical Specification, "Universal Mobile Telecommunications System (UMTS); Physical channels and mapping of transport channels onto physical channels (FDD) (3GPP TS 25.211 version 5.6.0 Release 5)", Sep. 2004, pp. 1-52, reference RTS/TSGR-0125211v560, Sophia Antipolis Cedex, France.

Boronka, Alexander, et al. "Improving MIMO Detection by L-Value Analysis and Adaptive Threshold-Based Cancellation", Globecom 2003, pp. 2099-2103, ISBN 0-7803-7974-8/03, IEEE.

Moberg, Johan, et al. "Throughput of the WCDMA Random Access Channel", to appear in proceedings of IST Mobile Communication Summit, Galway, Ireland, Oct. 1-4, 2000, 6 pages.

RadioLab 3G Reference System, "Random Access Channel Tasking", <http://web.archive.org/web/20050208002023/http://radiolab3g.com/images/ref2.html>, retrieved Aug. 26, 2009, 17 pages.

* cited by examiner

DECODING METHOD AND DEVICE

TECHNICAL FIELD

The present invention relates to a method and a device for decoding of data transmitted in a wireless digital communication system.

BACKGROUND

A UMTS communication system, defined in the UMTS standard comprises at least a node B and a mobile phone terminal, referred to as user equipment (UE). Both the node B and the UE includes a transmitter and a receiver. The node B sends signals by means of the node B transmitter to the UE receiver in the downlink. The UE sends signals by means of the UE transmitter to the node B receiver in the uplink. Several UE may communicate with a single node B. In this case the UE are said to be in the same cell. A cell represents the geographical area where a UE is served by a given node B.

In uplink and downlink communication both the UE and node B map the information and control data to be transmitted into logical channels. In particular, the UMTS standard provides for the downlink communication a logical channel denoted acquisition indication channel (AICH). When a UE attempts to establish a communication with a new node B, i.e. to join a new cell, it requests permission to be part of it. The standard procedure for this purpose, in which the AICH is employed, is called random access.

During random access, in order to request access to a cell, the UE sends a short information burst, called preamble, which comprises a signature in the form of Hadamard codes of length 16. Then, the UE waits a lapse in order to receive the response from the target node B. This lapse is called guard period. If the node B receives the preamble without errors, it responds with another burst called acquisition indication (AI).

If no AI is received by the UE after a pre-defined time, a new preamble is sent by the UE. In case of no answer from the node B, the UE re-sends with increased power the preamble up to a maximum number of times. In the case where the maximum number of preamble re-transmissions is reached and no successful AI reception is achieved, the UE signals this failure of the random access procedure to the higher network layers.

The AICH carries the node B messages, i.e. the AI, acknowledging all UE attempting to join a certain cell via random access requests. The AI are mapped on a ternary alphabet, which means that an AI can take on the values 1, 0, and −1. An AI is set to 1 or to −1 to represent a positive or a negative acknowledgement, respectively, from the Node B. If the Node B is unable to provide the service required by the UE then AI shall be set to 0.

All AI are transmitted by the node B on one single channel, the AICH and all UE receive all these AI that are intended for all UE. This means that each UE has to decode all information in all AI, even those that are not intended for that particular UE. A problem is then how to perform efficient decoding of the information in the AI.

According to prior art, standard block codes decoding techniques (e.g. J. G. Proakis, "Digital communications", McGraw Hill, 3rd Ed. p.436-460) well known to the person skilled in the art, are unable of performing effective decoding of the AI.

SUMMARY OF THE INVENTION

The object of the present invention is hence to solve a problem of how to perform efficient decoding of information in an AICH.

The present invention solves this problem in that it provides:

a method of decoding a symbol sequence in a received DS-CDMA signal, comprising iterative calculation of a hard-decision vector, using a decision threshold having a value based on the probability of each ternary alphabet element of each symbol in the hard-decision vector and, a user equipment capable of decoding a symbol sequence in a received DS-CDMA signal, comprising means for iterative calculation of a hard-decision vector, using a decision threshold having a value based on the probability of each ternary alphabet element of each symbol in the hard-decision vector.

A method according to the invention involves decoding a symbol sequence in a received DS-CDMA signal, comprising iterative calculation of a hard-decision vector, using a decision threshold having a value based on the probability of each ternary alphabet element of each symbol in the hard-decision vector.

In a preferred embodiment, the method involves a number of steps, including demodulating the received signal, thereby providing a symbol sequence, calculating a matrix product of the symbol sequence and the Hadamard decoding matrix, calculating an estimate of a decision threshold, assuming equal probability of the ternary alphabet element of each symbol in the symbol sequence, calculating a hard-decision vector using the calculated decision threshold, calculating an estimate of the probability of each ternary alphabet element of each symbol in the hard-decision vector, calculating a decision threshold using the estimate of the probability of each ternary alphabet element of each symbol in the hard-decision vector, iterating the steps of calculating a hard-decision vector, calculating an estimate of the probability of each ternary alphabet element of each symbol in the hard-decision vector and calculating a decision threshold using the estimate of the probability of each ternary alphabet element of each symbol in the hard-decision vector, until the calculation of a decision threshold converges or the number of iterations reaches a predetermined maximum number of iterations.

In comparison with prior art, the present invention is highly effective. That is, although standard block decoding could be adopted for the AICH decoding under ideal conditions, namely in the presence of an AWGN channel with a normalized signal amplitude (or a priori known signal amplitude), it would not be as efficient as the present invention, as is explained in the following.

Hadamard classic maximum likelihood (ML) decoding under AWGN channel is typically done by multiplying the received coded sequence by the Hadamard inverse matrix. Hard decision can be taken from the resulting decoded sequence.

In order for the ML criterion to apply, thresholds need to be computed to determine the decision regions. In the particular case of the AICH where AI are mapped on a ternary alphabet −1, 0, 1, two thresholds are needed. Under an ideal AWGN channel and known signal amplitude the thresholds are readily found at 0.5 and −0.5 times the signal amplitude. In practice those thresholds depend on the actual propagation conditions along with the RF to baseband receiver front-end, the AICH physical channel power level, which varies with time.

Estimating all those parameters at the receiver level might be feasible but highly computation-intensive and not cost-effective in terms of implementation. Moreover, even though suited estimators were implemented in the receiver, a thresholds adjustment mechanism should be implemented as well yielding additional complexity. Eventually, the estimation errors could have a significant impact on the threshold computation accuracy, potentially leading to poor decoder performance.

An advantage of the invention is hence that it provides efficient decoding of the AICH by optimally exploiting the whole available information. Further advantages include that an AICH decoder according to the invention can be implemented within any kind of UMTS receiver, in which no a-priori knowledge of the power of the AICH channel is needed, i.e. a "blind aspect" and it can be easily implemented in order to satisfy practical complexity constraints of a real-time system.

BRIEF DESCRIPTION OF THE DRAWINGS

Below follow exemplifying preferred embodiments of the present invention with accompanying drawings, in which.

PREFERRED EMBODIMENTS

Figure 1:
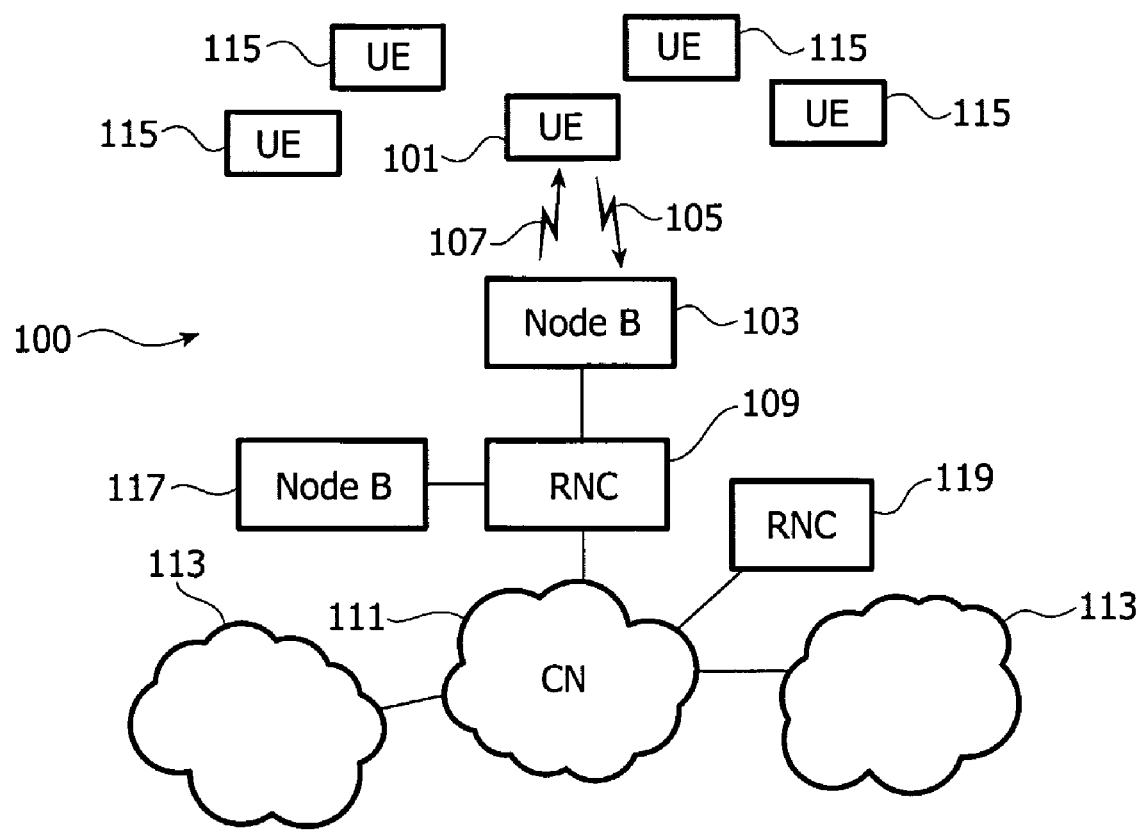
FIG. 1 shows schematically a system including a communication terminal according to the present invention.

In FIG. 1 a typical UMTS system 100 is schematically illustrated. User equipment 101 communicates with a node B 103 via an uplink 105 and a downlink 107. The node B 103 is connected to a core network 111 via a radio network controller 109. Other networks 113, such as other core networks, mobile communication networks (PLMN), fixed line telephone networks (PSTN) or any kind of data communication networks providing services to any kind and any number of devices and subscribers, are connected to the core network 111. As the skilled person realizes, the system can comprise almost any number of user terminals, as illustrated by terminals 115, and any number of node B and RNC, as illustrated by a second node B 117 and a second RNC 119, respectively.

Figure 2:
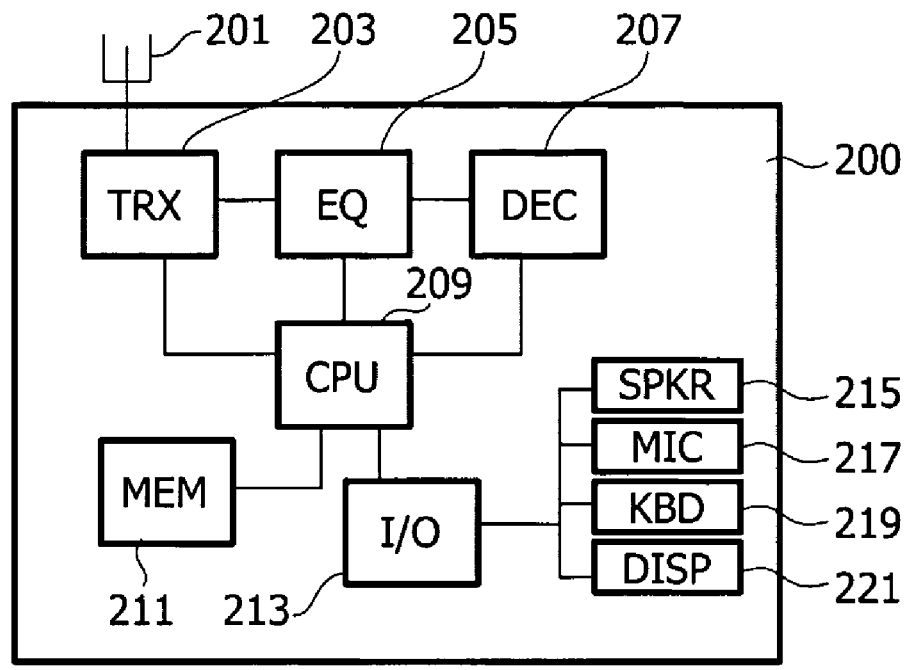
FIG. 2 shows schematically a communication terminal according to the present invention.

FIG. 2 shows in some more detail, although still schematically, user equipment 200 according to the present invention, which is suitable for use in a system 100 illustrated in FIG. 1 and capable of performing a method according to the present invention as will be discussed below. The user equipment 200 of FIG. 2 may be any of the UE 101, 115 illustrated in FIG.

The UE is controlled by a main controller 209, which controls the operation of a RF transceiver 203, an inner receiver (or channel equalizer) 205, a channel decoder 207. A memory 211 and an input/output unit 213 are also connected to the controller 209. A speaker 215, a microphone 217, a keyboard 219 and a display 221 are connected to the input/output unit 213 and provide a user with convenient means of using the UE when communicating with other users in the system 100.

The node B 103 sends signals by using its transmitter to the receiver in the UE on the downlink 107. The UE transmitter sends signals by means of the UE transmitter to the node B receiver in the uplink 105.

In uplink and downlink communication, both the UE and node B 103 map the data to be transmitted into logical channels. In particular the UMTS standard provides on the downlink 107 a logical channel denoted Acquisition Indicator Channel (AICH).

During downlink communication the node B 103 allocates the transmit powers to the logical channels to be transmitted to the UE in the cell of node B. The assigned transmit power is to be optimized in order to satisfy several constraints. Actually the power allocated to a certain UE should be high enough to guarantee that the received signal strength is sufficient to support the required type of service (i.e. to ensure the link quality necessary to support the service required by a certain UE), while it has to be minimized in order to minimize the interference to other UE in the same cell. Moreover the power assignment also has to dynamically adapt to the changes of propagation conditions, cell load (number of UE in the same cell and associated quality requirements), and users' service demand. All these factors are impacting the link quality.

The inner receiver, of the UE in the downlink and of the node B in the uplink respectively, process the received signal to compensate for the undesired effects of the propagation channel and mitigate the interference in order to optimize the performance of the outer receiver. The performance of the outer-receiver strongly depends on the signal-to-interference ratio (SIR) associated with the signal to be decoded that is provided at the output of the inner receiver. Thus in a first instance the goal of a conventional inner receiver is to maximize the SIR at its output in order to maximize the performance of the outer receiver.

Data Transmission and Reception in DS-CDMA

In order for the information dedicated to a certain user to be transmitted the source information data are properly mapped into a binary alphabet, i.e. into bits, via source-encoding techniques. Then depending on the logical channel under consideration, those bits may be channel-encoded by using suitable channel codes in order to protect the information bits from all causes impairment (noise, interference) during the transmission. In the particular case of AICH, there is no channel encoding. The channel-coded bits are then modulated by mapping bits into symbols according to a certain modulation scheme (e.g. QPSK modulation, well known by the person skilled in the art, where two bits are mapped into one symbol). In DS-CDMA systems, such as UMTS, said symbols are then spread over a larger bandwidth by filtering with specific spreading sequences. Spread symbols are usually referred to as chips. It should be noted that the duration of a chip period is smaller than the duration of a symbol period by a factor approximately equal to the bandwidth expansion factor of the spreading operation. This factor is equal to the number of chips per symbol period and it is referred to as the spreading factor.

Symbol sequences carrying information bits from different sources are spread with different spreading sequences in order for several users to share the same bandwidth and for the receivers to be able to discriminate and recover the desired user data symbol sequences based on the knowledge of the user-specific spreading sequence. The chips obtained are then filtered by a pulse-shape filter (a root-raised cosine filter in the case of UMTS) and digital-to-analog (D/A) converted. The resulting analog signal is then modulated to radio frequency and transmitted by the node B antenna(s) in the downlink or by the UE antenna in the uplink. The radio-frequency signal received on the UE antenna in the downlink or on the node B antenna(s) in the uplink, is demodulated down to baseband (or at intermediate frequency IF) and analog-to-digital (A/D) converted to generate a digital baseband signal.

Then the UE or the node B receiver processes that baseband signal in order to recover the useful information data intended for the user of interest. For this purpose, the receiver needs to estimate the cascade of the transmitter chain, the actual wireless propagation channel and receiver chain up to the A/D conversion, associated with the transmission of the useful data. Generally, that cascade is simply referred to as the channel and the term channel estimation typically denotes the set of procedures to be performed to estimate it.

Based on the channel estimate(s) the inner receiver or channel equalizer is set up in order to maximize the contribution of the desired signal and mitigate that of the interference. In other words it attempts to maximize the output SIR. The output of the inner receiver is sent to the outer receiver, or channel decoder that recover the useful data bit sequence, by actually undoing the channel-encoding operation performed at the transmitter. If the SIR at the output of the inner receiver is higher, the performance of the outer receiver in terms of signal decoding error probability will be better.

Figure 3:
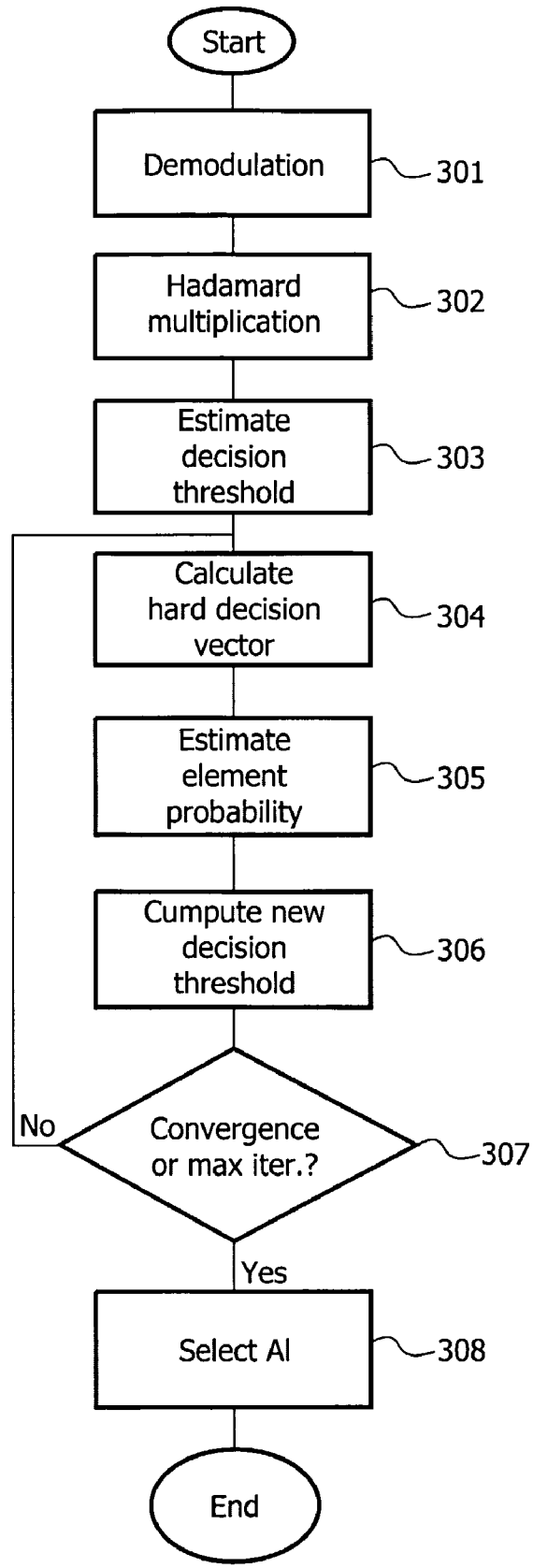
FIG. 3 is a flow chart of a method according to the present invention.

Below follows a detailed mathematical description of data transmission and reception in DS-CDMA, continuing with a mathematical description of AICH decoding and concluding with a step by step description, with reference to FIG. 3, of a method implementing the AICH decoding.

Signal and Channel Model

General DS-CDMA signal and channel models are provided.

General Received Signal Model

We consider a general case of transmission of a signal s(t) through a multipath channel with impulse response $h(t, \tau)$. The continuous-time complex base-band received signal prior to A/D conversion at the receiver is modelled as:

$$y(t)=x(t)+v(t) \quad (1)$$

where x(t) represents the part of received signal that comprises the useful data and v(t) denotes the noise plus interference term. The signal x(t) is given by:

$$x(t) = \int h(t, t-\tau)z(\tau)d\tau \quad (2)$$

where $h(t, \tau)$ represents a time-varying channel impulse response and $$z(t) = \sum_k a(k)\psi(t-kT_c) \quad (3)$$

represents the transmitted signal after D/A conversion at the transmitter, with $T_c$ denoting the chip period and $a(k)=s(\lfloor k/M \rfloor)d(k)$, where M denotes the spreading factor, and $\lfloor . \rfloor$ denotes the flooring operator. We shall in addition denote the symbol period $T_s=MT_c$. Moreover s(n) represents the n-th modulation symbol (e.g., QPSK), d(k) denotes the k-th chip of the spreading sequence, and $\psi(t)$ represents the pulse-shaping filter that limits the system bandwidth.

It is to be noted that this model can be used by systems with several spreading layers, like DS-CDMA system defined by the UMTS, IMT-2000 and IS-95 standard.

The channel $h(t, \tau)$ is assumed to follow the wide-sense stationary uncorrelated scattering model with Rayleigh fading and multipath response as described in "J. G. Proakis, Digital Communications, NY: McGraw-Hill, 3rd edition, 1995"

$$h(t, \tau) = \sum_{p=1}^{P} c_p(t)\delta(\tau - \tau_p) \quad (4)$$

where P denotes the number of multipath components, and $c_p(t)$ and $t_p$ denote the time-varying complex coefficient and the propagation delay associated with p-th multipath component. The path complex coefficients $c_p(t)$ vary depending on the velocity of the UE and of the surrounding scattering objects (e.g., buildings, hills but also other moving objects) with respect to the node B.

The signal y(t) represented in equation (1) is A/D converted giving rise to the discrete-time signal $y[i]=y(iT_c/Q)$ where Q denotes the over sampling factor with respect to the chip rate. The signal y[i] is processed by the inner receiver, that can be modelled as a linear time-varying filter f[i, n] in order to generate the output discrete-time signal at symbol rate:

$$r[n]=\alpha[n]s[n]+v[n] \quad (5)$$

where without loss of generality we assume that $|s[n]|=1$ and $$r[n] = \sum_{i=0}^{L+MQ-1} f[i, n]y(nT_s - iT_c/Q),$$

$$\alpha[n] = \sum_{i=0}^{L+MQ-1} f[i, n]h(nT_s - iT_c/Q, nT_s),$$

with $h[i, n]=h(iT_c/Q, nT_s)$, represents the impulse response of the cascade of the channel and the inner receiver filter, and where v[n] represents the noise plus interference term at the output of the inner receiver which, for the sake of simplicity, is modelled as a zero-mean complex circularly symmetric additive white Gaussian noise (AWGN).

In the following, the superscripts $(.)^T$ and $(.)^H$ denote transpose and Hermitian transpose respectively.

Blind AICH Decoder

AICH Transmission

Turning now to a description of AICH decoding, let $b=[b_1 \ldots b_{16}]^T$ denote the acquisition indicator column vector (16×1) whose elements are such that $b_i \in \{0,+1,-1\}$ for $i=1,\ldots,16$. Symbols are assumed to be equally likely.

The symbols comprising the vector $b=[b_1 \ldots b_{16}]^T$ are first mapped to $$b' = \frac{1+j}{\sqrt{2}}b$$

and then block-encoded $$s = H\, b'$$

where H denotes a 16×16 Hadamard encoding matrix. The resulting encoded symbols comprising the vector are then spread, scrambled and pulse shaped, according to the previous model. Then the resulting signal is digital-to-analog converted, modulated to radio frequency and transmitted.

AWGN Channel

An additive white Gaussian noise channel with flat slow fading is assumed. In case of fading, the coherence time is supposed to be larger than 2 slots. The transmitted signal s being spread over 4096 chips (less than 2 slots), the channel is consequently considered to be flat on the observation window.

At the inner receiver output, the signal can be written as $r[n]=\alpha s[n]+v[n]$, with $v[n]$ following a complex circularly symmetric Gaussian distribution $N_c(0, \sigma_v^2 I)$. $\alpha$ is a real gain factor modeling several contributions: power level of the AICH physical channel, propagation conditions, receiver RF to baseband gain, and the inner receiver impulse response.

Demodulation

The demodulated signal r'(16×1), is given by:

$$r' = \operatorname{Re}\left\{ \frac{(1-j)}{\sqrt{2}} \cdot r \right\}$$

Blind AICH Decoder r' is multiplied by the decoding matrix that is $H^{-1}$. Due to the Hadamard matrix properties, we have $$H^{-1} = \frac{1}{16} H.$$

Let g denote the vector(16×1) of soft decision values output of the decoding matrix $$g = \frac{1}{16} H \cdot r' = \alpha \cdot \hat{b} \qquad (6)$$

with $\hat{b}$ being the estimate of b initial acquisition indicator vector. Consequently:

$$\hat{b} = \frac{g}{\hat{\alpha}} \text{ and } \hat{b}_i \in \{-1, 0, +1\} \text{ for } i = 1, \ldots, 16.$$

The "blind" aspet comes from the fact that there is no a-priori knowledge of α Typically, this algorithm can be applied without any knowledge of the AICH channel power level and without any estimation of the global receiver gain (radio modules gain+inner receiver gain). Conversely, there is no need for the Node B to transmit any AICH power information (avoiding some overhead) if this algorithm is implemented in the UE.

Equation (6) leads to the following estimation model:

$$g = \alpha \cdot b + \eta$$

with η following a real Gaussian distribution $N(0, \sigma_\eta^2 I)$.

The blind AICH decoder uses this relation to estimate $\hat{\alpha}$ and $\hat{b}$ jointly. This is done in an iterative way, until the system is frozen ($\hat{\alpha}$ and $\hat{b}$ estimates "stable").

Figure 4:
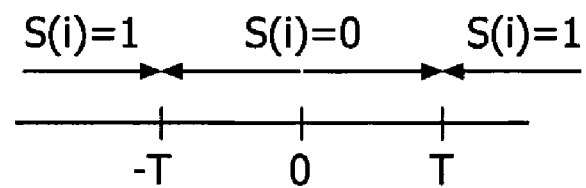
FIG. 4 shows the decision regions for soft AICH decoding.

In the following, the problem is considered to be symmetric, due to the zero-mean AWGN, and the a-priori probability (⅓) of each element in b. Consequently, the decision scheme can be illustrated as in FIG. 4, with the decision threshold $$T = \frac{\alpha}{2}.$$

For example, consider the operations at iteration 0:

$K_-$: number of strictly negative elements inside g.
$K_+$: number of positive (or null) elements inside g.
$n_0$: number of occurrences for the event "$g_i=0$"
$n_{-1}$: number of occurrences for the event "$g_i=-1$"

with i such as $g_i < 0$ (assuming there is at least one negative in g):

$$M_- = \frac{1}{K_-} \left| \sum g_i \right| \approx \frac{n_{-1} \cdot \alpha + n_0/2 \cdot 0}{K_-} = \frac{n_{-1} \cdot \alpha}{3/2 \cdot n_{-1}} = \frac{2}{3} \cdot \alpha \Rightarrow \tilde{\alpha}_-^{(0)} \approx \frac{3}{2} \cdot M_-$$

Because this estimation is symmetric, the same remarks can be made for the positive elements inside g, and we obtain another α estimate at iteration 0, called $\tilde{\alpha}_+^{(0)}$. With i such as $g_i \geq 0$ (assuming there is at least one positive in g):

$$M_+ = \frac{1}{K} \left| \sum g_i \right| \approx \frac{2}{3} \cdot \alpha \Rightarrow \tilde{\alpha}_+^{(0)} \approx \frac{3}{2} \cdot M_+$$

Let $\tilde{\alpha}^{(0)}$ denote the estimation at iteration 0:

case 1: $K_-$ and $K_+$ different from 0

$$\tilde{\alpha}^{(0)} = \frac{1}{2} \cdot (\tilde{\alpha}_+^{(0)} + \tilde{\alpha}_-^{(0)}) = \frac{3}{4} \cdot (M_+ + M_-)$$

case 2: $K_+$ only is different from 0

$$\tilde{\alpha}^{(0)} = \tilde{\alpha}_+^{(0)} = \frac{3}{2} \cdot M_+$$

case 3: $K_-$ only is different from 0

$$\tilde{\alpha}^{(0)} = \tilde{\alpha}_-^{(0)} = \frac{3}{2} \cdot M_-$$

Having now a first estimation of $\tilde{\alpha}^{(0)}$ and applying the decision scheme described in FIG., we get a first estimate of b called $\hat{b}^{(0)}$ following the rules below:

For i=0, ..., 15:

$$\hat{b}_i^{(0)} = 1 \text{ if } g_i > \frac{\tilde{\alpha}^{(0)}}{2} \qquad (7)$$

-continued $$\hat{b}_i^{(0)} = 0 \text{ if } |g_i| \le \frac{\tilde{\alpha}^{(0)}}{2}$$

$$\hat{b}_i^{(0)} = -1 \text{ if } g_i < \frac{\tilde{\alpha}^{(0)}}{2}$$

Now, considering the operations at iteration k (k>0).

Similarly to iteration 0 we first estimate $\tilde{\alpha}^{(k)}$ and then we use it to get $\hat{b}^{(k)}$. However, the main difference is that the estimation of $\tilde{\alpha}^{(k)}$ is made as a function of $\hat{b}^{(k-1)}$.

Some variables need to be defined at iteration k:
$n_+^{(k)}$: number of "+1" in the vector $\hat{b}^{(k)}$
$n_-^{(k)}$: number of "−1" in the vector $\hat{b}^{(k)}$ With i such as $g_i < 0$ and if $n_-^{(k-1)} \ne 0$:

$$\tilde{\alpha}_-^{(k)} = \frac{|\sum g_i|}{n_-^{(k-1)}}$$

With i such as $g_i > 0$ and if $n_+^{(k-1)} \ne 0$:

$$\tilde{\alpha}_+^{(k)} = \frac{|\sum g_i|}{n_+^{(k-1)}}$$

Then we get:

$$\tilde{\alpha}^{(k)} = \frac{1}{2} \cdot (\tilde{\alpha}_+^{(k)} + \tilde{\alpha}_-^{(k)})$$

If $n_+^{(k-1)} = 0$ the expression is simplified: $\tilde{\alpha}^{(k)} = \tilde{\alpha}_-^{(k)}$ or if $n_-^{(k-1)} = 0$, then $\tilde{\alpha}^{(k)} = \tilde{\alpha}_+^{(k)}$.

Finally, we get an estimate of $\hat{b}^{(k)}$ in function of $\tilde{\alpha}^{(k)}$, using the same decision rules as in iteration 0, rules described by equation (7).

In theory, we should iterate until $\hat{b}(k)$ converges (i.e. "system frozen"). Simulations have shown that 3 iterations are typically sufficient.

Then the last step consists in selecting the only AI of interest for the specific UE, among the $\hat{b}^{(k)}$ elements. This AI index is provided by the Node B.

Turning now to FIG., the algorithm described in mathematical terms above will be described by way of a number of steps in a method. The method is preferably realized by way of software instructions in a control unit of user equipment, such as the user equipment 101, 200 described above in connection with FIGS. 1 and 2.

The method is suited to implementation within any UMTS base-band receiver, such as for instance a conventional RAKE receiver (the RAKE receiver is well known to the person skilled in the art).

The method involves preparatory calculations, including providing models for the propagation channel for the AICH, said models being a linear superposition of a finite number P of discrete multipath components following an uncorrelated-scattering wide-sense stationary model, a multipath component being characterized by a time-varying complex coefficient and a delay.

Further preparatory calculations include building the discrete-time version of the received signal corresponding to the AICH logical channel at the output of the inner receiver.

Then, performing AICH decoding as follows:

In a demodulation step 301, remove symbol modulation from the received signal at the output of the inner receiver corresponding to the AICH.

In a multiplication step 302, compute the matrix product of the signal obtained in the demodulation step 301 and the Hadamard decoding matrix.

In an estimation step 303, estimate a decision threshold assuming the equal probability of each AI ternary alphabet element (−1, 0, 1 }.

In a calculation step 304, calculate hard decisions (−1, 0 or 1) on the output of the multiplication step 302 using the threshold computed at the estimation step 303.

In an estimation step 305, estimate the probability of each element {−1, 0, 1} in the hard-decision vector obtained at the calculation step 304.

In a calculation step 306, calculate a new decision threshold, but instead of assuming the equal probability of each AI alphabet element like in the multiplication step 302, using the probability estimated at the estimation step 305.

In a decision step 307, deciding whether to perform steps 304 to 307 or stop the iterative process and perform a selection step 308, if the decision threshold has converged to a fixed value, or if the maximum number of iterations has been reached.

In the selection step 308, select from the hard-decision vector elements, the only AI of interest for the UE (the index of this AI given by node B).

It is to be understood that the present invention is not limited to the aforementioned embodiments and variations and modifications may be made without departing from the spirit and scope of the invention as defined in the appended claims.

In particular, it is to be understood that the present invention is not limited to the aforementioned UMTS application. It can be used within any application of DS-CDMA or of other wireless communication systems where the communication standard envisages the presence of a logical channel comprising symbols or signal waveform(s) unknown to the receiver.

It is to be understood that the methods according to the present invention are not limited to the aforementioned implementation. There are numerous ways of implementing functions of the methods according to the invention by means of items of hardware or software, or both, provided that a single item of hardware or software can carry out several functions. It does not exclude that an assembly of items of hardware or software or both carry out a function. For instance, algorithms steps can be combined, thus forming a single function without modifying the methods of channel estimation with transmit beam forming in accordance with the invention.

The hardware and/or software items can be implemented in several manners, such as by means of wired electronic circuits or by means of an integrated circuit that is suitably programmed respectively. The integrated circuit is to be part of a receiver that can be contained in a computer, in a mobile communication handset, in a base-station, or in any other communication system device. Said receiver comprises means of the receiver adapted to make all necessary operations to support a certain type of communication service (i.e. operations of de-scrambling, de-spreading, etc.) said means being hardware or software items as stated above.

The invention claimed is:

1. A method of decodinq a symbol sequence in a received DS-CDMA signal, comprising the steps of:
   iterative calculation of a hard-decision vector, using a decision threshold having a value based on the probability of each ternary alphabet element of each symbol in the hard-decision vector;
   demodulating the received signal, thereby providing a symbol sequence;
   calculating a matrix product of the symbol sequence and a Hadamard decoding matrix;
   calculating an estimate of a decision threshold, assuming equal probability of the ternary alphabet element of each symbol in the symbol sequence;
   calculating a hard-decision vector using the calculated decision threshold;
   calculating an estimate of the probability of each ternary alphabet element of each symbol in the hard-decision vector;
   calculating a decision threshold using the estimate of the probability of each ternary alphabet element of each symbol in the hard-decision vector; and
   iterating the steps of calculating a hard-decision vector, calculating an estimate of the probability of each ternary alphabet element of each symbol in the hard-decision vector and calculating a decision threshold using the estimate of the probability of each ternary alphabet element of each symbol in the hard-decision vector, until the calculation of a decision threshold converges or the number of iterations reaches a predetermined maximum number of iterations.

2. The method according to claim 1, wherein the symbol sequence is a sequence of acquisition indicators in an acquisition indicator channel and further comprises the step of:
   selecting the AI of interest from the calculated hard-decision vector using a predetermined index.

3. A user equipment apparatus capable of decoding a symbol sequence in a received DS-CDMA signal, comprising:
   means for iterative calculation of a hard-decision vector, using a decision threshold having a value based on the probability of each ternary alphabet element of each symbol in the hard-decision vector;
   means for demodulating the received signal, thereby providing a symbol sequence;
   means for calculating a matrix product of the symbol sequence and a Hadamard decoding matrix;
   means for calculating an estimate of a decision threshold, assuming equal probability of the ternary alphabet element of each symbol in the symbol sequence;
   means for calculating a hard-decision vector using the calculated decision threshold;
   means for calculating an estimate of the probability of each ternary alphabet element of each symbol in the hard-decision vector;
   means for calculating a decision threshold using the estimate of the probability of each ternary alphabet element of each symbol in the hard-decision vector; and
   means for iterating the steps of calculating a hard-decision vector, calculating an estimate of the probability of each ternary alphabet element of each symbol in the hard-decision vector and calculating a decision threshold using the estimate of the probability of each ternary alphabet element of each symbol in the hard-decision vector, until the calculation of a decision threshold converges or the number of iterations reaches a predetermined maximum number of iterations.

4. The apparatus of claim 3, wherein the symbol sequence is a sequence of acquisition indicators in an acquisition indicator channel and further comprises means for selecting the AI of interest from the calculated hard decision vector using a predetermined index.

5. An apparatus, comprising:
   a RF transceiver;
   an inner receiver coupled to the RF transceiver;
   a channel decoder coupled to the inner receiver;
   a controller coupled to the RF transceiver, the inner receiver and the channel decoder; and
   a memory coupled to the controller, wherein the apparatus is capable of selecting acquisition indicators comprising calculating a decision threshold using an estimate of a probability of each ternary alphabet element of each symbol in a hard-decision vector, until a calculation of a decision threshold converges or a number of iterations reaches a predetermined maximum number of iterations.

6. The apparatus of claim 5, wherein the inner receiver comprises a channel equalizer.

7. The apparatus of claim 5, further comprising at least one of a speaker, microphone, keyboard, and display coupled to the controller.

8. The apparatus of claim 5, wherein the inner receiver comprises a channel equalizer.

9. A method of decoding a symbol sequence in a received DS-CDMA signal with a user equipment, comprising the steps of:
   demodulating a received signal;
   computing a matrix product of the demodulated signal and a Hadamard decoding matrix;
   estimating a decision threshold;
   calculating a hard-decision vector with the computed matrix product;
   estimating probability of each ternary alphabet element of each symbol in the hard-decision vector;
   calculating a new decision threshold using the estimate of the estimating probability step; and
   iterating until a calculation of a decision threshold converges or the number of iterations reaches a predetermined maximum number of iterations to select hard-decision vector elements.

* * * * *

UNITED STATES PATENT AND TRADEMARK OFFICE
CERTIFICATE OF CORRECTION

PATENT NO. : 7,653,865 B2  Page 1 of 1
APPLICATION NO. : 10/584502
DATED : January 26, 2010
INVENTOR(S) : Demaj et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 757 days.

Signed and Sealed this

Twenty-third Day of November, 2010

David J. Kappos
*Director of the United States Patent and Trademark Office*